United States Patent Office 3,449,386
Patented June 10, 1969

3,449,386
STABLE ALKYLENE-BIS-DITHIOCARBAMATES
Pierre Chiffert and Gilbert Rols, Marseilles, France, assignors to Procida, Marseilles, France, a corporation of France
No Drawing. Filed Nov. 21, 1966, Ser. No. 595,567
Claims priority, application France, Dec. 1, 1965, 40,461
Int. Cl. C07f 13/00; A01n 9/12
U.S. Cl. 260—429                    7 Claims

ABSTRACT OF THE DISCLOSURE

The invention relates to manganous alkylene-bis-dithiocarbamate compositions stabilized with 1,8-3,6-diendomethylene-1,3,6,8-tetraazacyclodecane and to a method of stabilizing manganous alkylene-bis-dithiocarbamate compositions.

STATE OF THE ART

Manganous ethylene-bis-dithiocarbamate is widely used as an agricultural fungicide and is accepted under the common name Maneb. However, the said product is not entirely stable, and undergoes decomposition not only during its manufacture, but also during storage. Under certain conditions, Maneb can undergo charring or carbonization or ignite during its manufacture. Storage of the product for prolonged periods, particularly at temperatures higher than average median temperatures leads to development of disagreeable odors with the product turning brown as well as to a reduction in its fungicidal activity.

OBJECTS OF THE INVENTION

It is an object of the invention to provide stable compositions containing manganous lower alkylene-bis-dithiocarbamates.

It is another object of the invention to provide a novel process for stabilizing manganous lower alkylene-bis-dithiocarbamates.

These and other objects and advantages of the invention will become obvious from the following detailed description.

The novel stable compositions of the invention are comprised of a homogenous mixture of at least one manganous lower alkylene-bis-dithiocarbamate wherein the alkylene has 1 to 7 carbon atoms and a small amount of 1,8-3,6 - diendomethylene-1,3,6,8-tetraazacyclodecane which will be designated as Dimtac hereinafter. The preferred amount of Dimtac is between 0.5 to 5.0% by weight of the manganous salt. Greater quantities may be used, but do not prove advantageous.

The preferred manganous lower alkylene-bis-dithiocarbamate is manganous ethylene - bis - dithiocarbamate, (Maneb), because of its excellent fungicide activity. Maneb may be made by known processes by reacting a soluble manganous salt with a soluble salt of ethylene-bis-dithiocarbamic acid in an aqueous medium and recovering the precipitate.

Dimtac can be incorporated with manganous lower alkylene-bis-dithiocarbamates during production of the latter such as by incorporating Dimtac into moist paste of Maneb obtained by filtration of the reaction medium, or it can be added to the dry, commercial product such as together with carriers and surface-active agents when Maneb is prepared as a wettable powder or as a dusting powder.

The compositions of the invention of manganous lower alkylene-bis-dithiocarbamates admixed with Dimtac are very effective fungicides and have a high degree of activity even after prolonged periods of storage.

In the following examples, there are described several preferred embodiments to illustrate the invention. However, it should be understood that the invention is not intended to be limited to the specific embodiments.

Example I

Manganous ethylene-bis-dithiocarbamate was prepared by reacting manganous chloride with a soluble salt of ethylene-bis-dithiocarbamic acid in an aqueous medium and the precipitate was vacuum filtered, washed with water and again vacuum filtered to obtain a product containing about 25% water. Then the product was impregnated with an aqueous solution containing 50% of Dimtac and was vacuum filtered. The weight of the added Dimtac corresponded with 1.5% of the calculated weight of manganous ethylene-bis-dithiocarbamate. The product was then dried under vacuum at 50° C.

The resulting product was subjected to a so-called "carbonization test" in which 40 gm. of the product were placed in an unstoppered 125 cc. glass bottle. 40 gm. of the manganous ethylene-bis-dithiocarbamate without Dimtac were introduced in a second unstoppered bottle. The said bottles were then placed in an incubator heated to 120° C.±1°. After 1 hour the bottles were taken out of the incubator and 0.2 cc. of water (about 3 drops) was added to each bottle. The product not containing the Dimtac turned black a few minutes after the drops were added to the product, after which the mass became black and totally carbonized while emitting a disagreeable odor until only a charred blackish residue remained. On the other hand, no blackening or any change whatsoever was observed in the product containing Dimtac.

Dimtac was prepared by reacting ethylene diamine with an aqueous solution of formaldehyde according to the method of Bischoff (Ber., vol. 31, pp. 3248, 1898).

Example II 180 parts by weight of dry, commercial Maneb were admixed with 10 parts by weight of sodium lignosulfonate, 2 parts by weight of sodium alkylnaphthalene sulfonate and 8 parts by weight of kaolin to obtain a wettable powder and the resulting Maneb composition was divided into two equal parts. One half was admixed with 1 part by weight of dry Dimtac and the two compositions were subjected to the carbonization test of Example I. The product containing Dimtac remained unchanged while the product without Dimtac became carbonized. These two examples demonstrate that Maneb in its formulated and unformulated form is stabilized by the addition of Dimtac.

Example III

Various samples of manganous ethylene-bis-dithiocarbamate were subjected to an accelerated decomposition by placing them in an incubator at 95° C. in a humid atmosphere. The decomposition of the active product was determined from the carbon disulfide capable of being liberated according to the method described by Roth (Applied Chem., 1961, No. 5, 167).

Table I illustrates the favorable stabilizing action of Dimtac on technical manganous ethylene-bis-dithiocarbamate and the formulated product of Example II.

TABLE I

|  | Initial content of active product | After 3 days at 95° C. | Content after 9 days at 95° C. | Loss 9 days in percent of initial content |
|---|---|---|---|---|
| (1) Technical manganous ethylene-bis-dithiocarbamate, percent | 93.2 | 75.5 | 66.3 | 29 |
| (2) Same product+1% of Dimtac, percent | 92.3 | 77.5 | 74.3 | 19.5 |
| (3) Manganous ethylene-bis-dithiocarbamate prepared according to Example 2 without Dimtac, percent | 84 | 63.9 | 50.4 | 40 |
| (4) Same product as in "(3)"+1% of Dimtac, percent | 83.6 | 70.2 | 70.2 | 16 |

Example IV

Different samples of manganous ethylene-bis-dithiocarbamate, prepared according to Example II, were subjected to an accelerated decomposition in an atmosphere saturated with water at a temperature of 20° C. under vacuum, the vacuum being alternately discontinued and started again every 12 hours. The content of active product was determined according to the Roth process as described in Example III. The results obtained are given in Table II.

TABLE II

|  | Active product initial content | After 3 days | Loss in percent of initial content |
|---|---|---|---|
| (1) Control manganous ethylene-bis-dithiocarbamate prepared according to Example II, percent | 84.7 | 67.6 | 20 |
| (2) Same product+1% of Dimtac, percent | 84 | 77.8 | 7.5 |

Example V

The compositions used in Example IV were heated in an incubator at 50° C. in the laboratory ventilated in a natural manner. The percent of active content was determined by the Roth manner after 1 month and the results are given in Table III.

TABLE III

|  | Initial content of active product | Content after 1 month |
|---|---|---|
| (1) Manganous ethylene-bis-dithiocarbamate prepared in the form of wettable powder according to Example II, percent | 78 | 72.5 |
| (2) Same product+1% of Dimtac, percent | 77.5 | 76.4 |

Various modifications of the process and compositions of the invention may be made without departing from the spirit or scope thereof and it is to be understood that the invention is to be limited only as defined in the appended claims.

We claim:

1. A stable solid composition consisting essentially of a homogenous mixture of at least one manganous lower alkylene-bis-dithiocarbamate and 0.5 to 5.0% by weight based on said manganous compound of 1,8-3,6-di-endomethylene-1,3,6,8-tetraazacyclodecane.

2. The composition of claim 1 wherein the manganous lower alkylene-bis-dithiocarbamate is manganous ethylene-bis-dithiocarbamate.

3. The composition of claim 1 wherein the amount of 1,8-3,6 - di-endomethylene-1,3,6,8-tetraazacyclodecane is 0.5 to 5% by weight based on the manganous lower alkylene-bis-dithiocarbamate.

4. The composition of claim 2 wherein the amount of 1,8-3,6-di-endomethylene-1,3,6,8-tetraazacyclodecane is 0.5 to 5% by weight based on the manganous lower alkylene-bis-dithiocarbamate.

5. A process for stabilizing manganous lower alkylene-bis-dithiocarbamates which comprises thoroughly admixing manganous lower aklylene-bis-dithiocarbamate with up to 5% by weight of 1,8-3,6-diendomethylene-1,3,6,8-tetraazacyclodecane.

6. The process of claim 5 wherein the manganous lower alkylene-bis-dithiocarbamate is manganous ethylene-bis-dithiocarbamate and the amount of 1,8-3,6-diendomethylene-1,3,6,8-tetraazacyclodecane is 0.5 to 5% by weight of the manganous salt.

7. The process of claim 6 wherein the manganous ethylene-bis-dithiocarbamate is used as a moist paste and the said paste is impregnated with aqueous solution of the said tetraazacyclodecane and the resulting paste is dried.

References Cited

UNITED STATES PATENTS 2,974,156    3/1961    Sobatzki    260—429

FOREIGN PATENTS 1,356,258    2/1964    France.

TOBIAS E. LEVOW, Primary Examiner.

A. P. DEMERS, Assistant Examiner.

U.S. Cl. X.R.

252—401, 405; 424—286